United States Patent
Cottet et al.

(10) Patent No.: US 8,573,354 B1
(45) Date of Patent: Nov. 5, 2013

(54) NOISE SUPPRESSION SYSTEM FOR HOLLOW VEHICLE FASTENERS

(75) Inventors: Justin Duane Cottet, Snohomish, WA (US); Mark Lomen Sandstrom, Seattle, WA (US); David Brian Christman, Ravensdale, WA (US)

(73) Assignee: The Boeing Company, Chicago, IL (US)

(*) Notice: Subject to any disclaimer, the term of this patent is extended or adjusted under 35 U.S.C. 154(b) by 34 days.

(21) Appl. No.: 13/311,865

(22) Filed: Dec. 6, 2011

(51) Int. Cl.
*F01N 5/00* (2006.01)

(52) U.S. Cl.
USPC ............................................. 181/211; 244/1 N

(58) Field of Classification Search
USPC .......................................... 181/211; 244/1 N
See application file for complete search history.

(56) References Cited

U.S. PATENT DOCUMENTS

| | | | |
|---|---|---|---|
| 6,619,587 B1 | 9/2003 | Chow et al. | |
| 7,735,601 B1* | 6/2010 | Stieger et al. | 181/213 |
| 7,784,585 B2* | 8/2010 | Greenwood | 181/211 |
| 8,028,802 B2* | 10/2011 | Durchholz et al. | 181/290 |
| 2008/0206044 A1* | 8/2008 | Porte et al. | 415/119 |
| 2009/0321559 A1 | 12/2009 | Chow et al. | |
| 2011/0001004 A1 | 1/2011 | Wood | |
| 2011/0168839 A1* | 7/2011 | Porte et al. | 244/1 N |
| 2012/0267475 A1* | 10/2012 | Campos | 244/1 N |

* cited by examiner

*Primary Examiner* — Forrest M Phillips
(74) *Attorney, Agent, or Firm* — Yee & Associates, P.C.

(57) ABSTRACT

A method and apparatus for controlling noise. An apparatus may comprise a structure configured to be positioned at an opening for a channel. The channel may be formed at least partially within a fastener. The structure may be configured to change a movement of air within the channel to reduce noise generated by the movement of air within the channel.

24 Claims, 14 Drawing Sheets

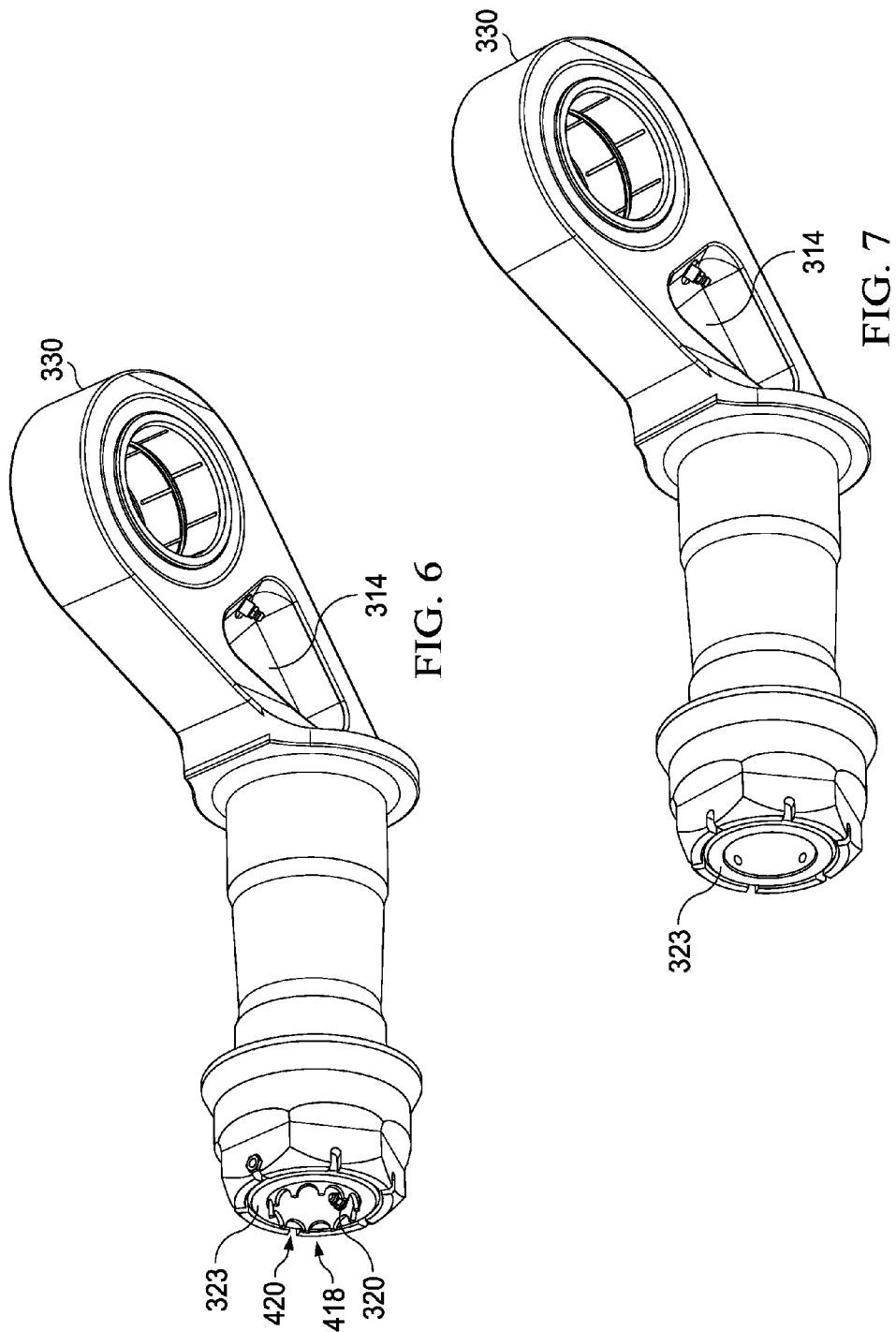

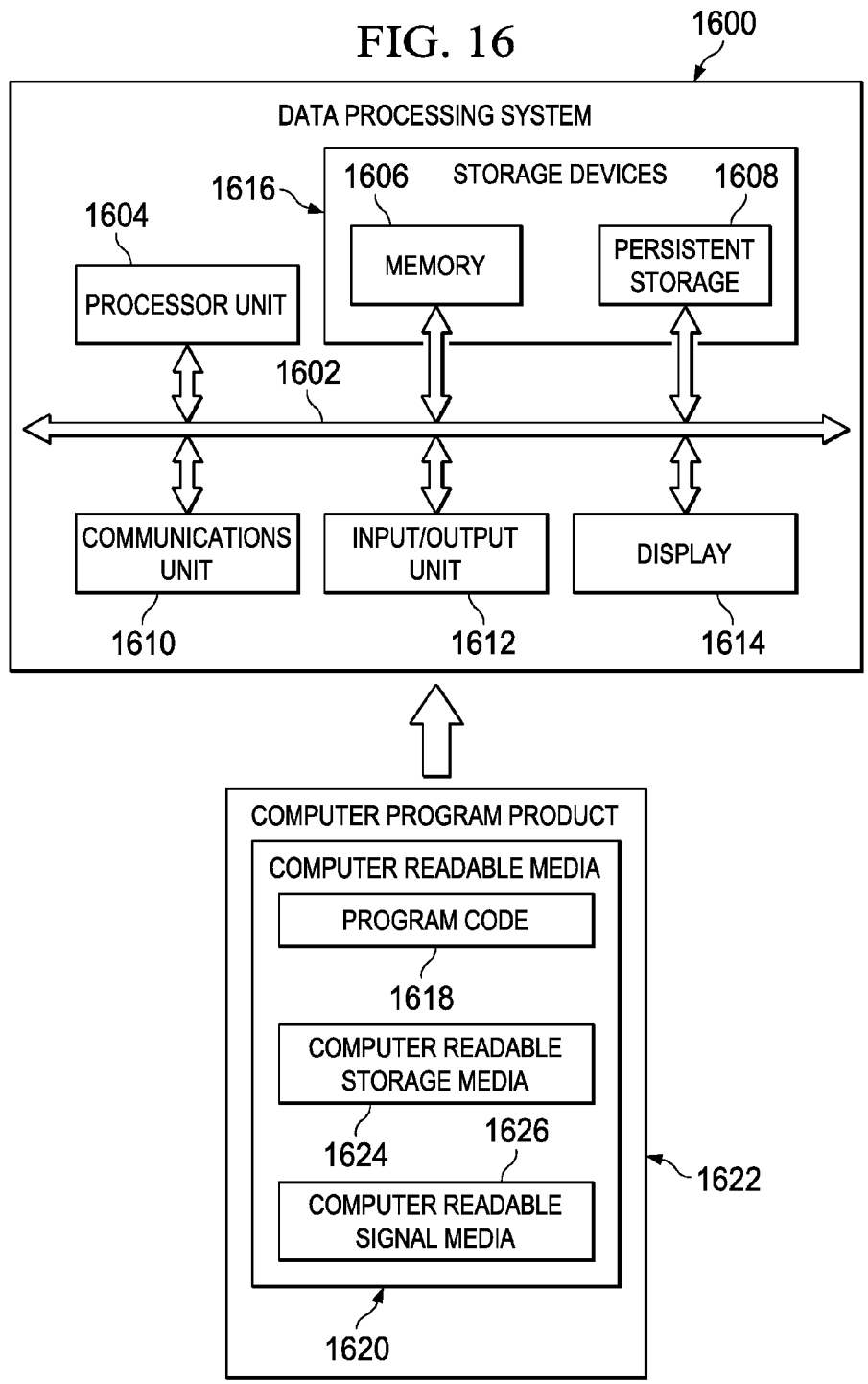

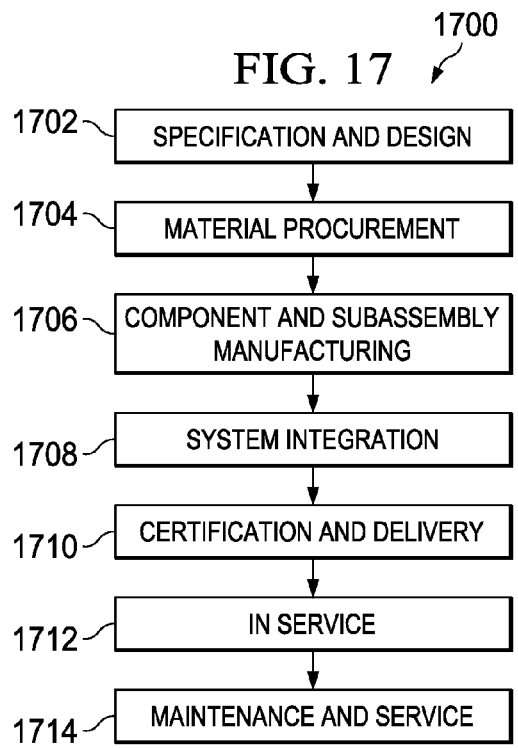
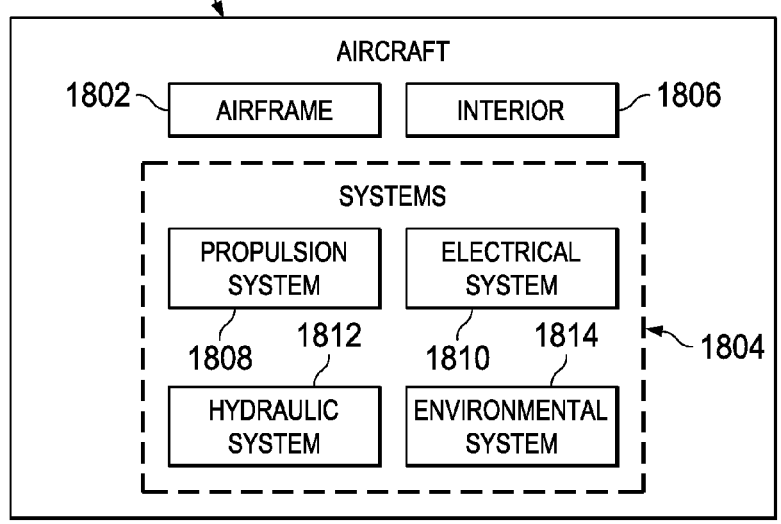

NOISE SUPPRESSION SYSTEM FOR HOLLOW VEHICLE FASTENERS

BACKGROUND INFORMATION

1. Field

The present disclosure relates generally to vehicles and, in particular, to suppressing noise generated by vehicles. Still more particularly, the present disclosure relates to a method and apparatus for reducing noise in hollow pins used in vehicles.

2. Background

A source of aircraft noise may be aerodynamic noise. Aerodynamic noise may arise from the airflow around the fuselage of an aircraft, control surfaces, and other surfaces on the aircraft. This type of noise may increase with aircraft speed and at low altitudes because of the increased density of air.

Noise from aircraft may be undesirable. Aircraft designers, manufacturers, and/or operators may develop quieter aircraft and improved operating procedures to reduce aircraft noise. For example, without limitation, changes to aircraft design may be used to decrease noise generated by aircraft.

Hollow pins used to connect structures in an aircraft may contribute to the overall noise generated by an aircraft. For example, without limitation, during operation of an aircraft, air may flow over openings at the ends of hollow pins used to connect structures in the aircraft. As a specific example, during flight, air may flow over the openings at the ends of hollow pins used to connect structures in a landing gear system. The flow of air over these openings may generate noise. This noise may be one form of aerodynamic noise that contributes to the overall aerodynamic noise generated by an aircraft.

Therefore, it would be desirable to have a method and apparatus that takes into account at least some of the issues with the noise generated by an aircraft as discussed above as well as possibly other issues.

SUMMARY

In one illustrative embodiment, a noise reduction apparatus may comprise a structure configured to be positioned at an opening for a channel. The channel may be formed at least partially within a fastener. The structure may be configured to change a movement of air within the channel to reduce noise generated by the movement of air within the channel.

In another illustrative embodiment, a method for operating a vehicle to control noise generated by the vehicle may be present. The vehicle may be moved. The vehicle may have a system with a fastener connecting structures in the system to each other. A channel having an opening may be formed at least partially within the fastener. A movement of air within the channel may be changed using a structure positioned at the opening for the channel to reduce noise generated by the movement of air within the channel.

In still another illustrative embodiment, an aircraft noise reduction system may comprise a pin and a noise reduction structure. The pin may be configured to connect structures in a system in an aircraft to each other. A channel having an opening may be formed at least partially within the pin. The pin may be connected to the structures in the system using a fastener system. The system may be selected from one of a landing gear, a cargo bay, an engine, a control surface system, a door, a cargo door, a pivot system, and a landing gear door. The noise reduction structure may be positioned at the opening for the channel. The noise reduction structure may be configured to change a movement of air through the channel in a manner that reduces noise generated by the movement of air through the channel to within selected tolerances such that the noise is reduced to a level below a selected level of audibility. The noise reduction structure may have a first end and a second end. The first end may be configured to be placed into the channel through the opening for the channel. The first end and the second end may be configured to be one of fully open, partially open, and closed. At least one of the first end and the second end may be configured to change the movement of air through the channel in the manner that reduces the noise generated by the movement of air through the channel to within the selected tolerances by at least one of reducing a pathway for the movement of air at the opening for the channel and disrupting a flow of air over the opening for the channel. The noise reduction structure may be configured to be associated with the pin by the fastener system.

In yet another illustrative embodiment, a method may be present for operating an aircraft to control noise generated by the aircraft. The aircraft may have a system with a pin connecting structures in the system to each other. The aircraft may be moved such that a flow of air occurs over an opening for a channel formed at least partially within the pin. The pin may be connected to the structures using a fastener system. The system may be selected from one of a landing gear, a cargo bay, an engine, a control surface system, a door, a cargo door, a pivot system, and a landing gear door. A movement of air within the channel may be changed using a structure positioned at the opening for the channel to reduce noise generated by the movement of air within the channel to within selected tolerances. A noise reduction structure may be configured to change the movement of air through the channel in a manner that reduces the noise generated by the movement of air through the channel to within the selected tolerances by at least one of reducing a pathway for the movement of air at the opening for the channel and disrupting the flow of air over the opening for the channel. The noise may be reduced to within the selected tolerances such that the noise is reduced to a level below a selected level of audibility. The noise reduction structure may be configured to be associated with the pin by the fastener system.

The features and functions may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 6 is an illustration of a fastener with a noise reduction structure in accordance with an illustrative embodiment;

FIG. 7 is an illustration of a fastener in accordance with an illustrative embodiment;

FIG. 16 is an illustration of a data processing system in accordance with an illustrative embodiment;

FIG. 17 is an illustration of an aircraft manufacturing and service method in accordance with an illustrative embodiment; and FIG. 18 is an illustration of an aircraft in which an illustrative embodiment may be implemented.

DETAILED DESCRIPTION

The different illustrative embodiments recognize and take into account that reducing any noise source in an aircraft may be helpful in reducing the overall noise of an aircraft. For example, the different illustrative embodiments recognize and take into account that with respect to aerodynamic noise, fasteners, such as pins used in aircraft to hold structures together, may generate noise.

The different illustrative embodiments recognize and take into account that a pin may be used to hold and/or fasten parts together. The different illustrative embodiments recognize and take into account that pins used in aircraft may be hollow pins. In other words, the pin may be a hollow cylinder or a cylinder with a channel extending through the cylinder. A hollow pin may be used to reduce the weight in the aircraft.

The different illustrative embodiments recognize and take into account that openings at the end of hollow pins may generate noise. The different illustrative embodiments recognize and take into account that reducing noise from these types of pins may contribute to reducing the overall noise generated by an aircraft.

Thus, an illustrative embodiment may provide a method and apparatus for controlling noise. In one illustrative embodiment, a noise reduction apparatus may comprise a structure. The structure may be configured to be positioned at an opening for a channel. The channel may be formed at least partially within a fastener. The structure may be configured to change a movement of air within the channel in a manner that reduces noise generated by the movement of air within the channel to within selected tolerances.

Figure 1:
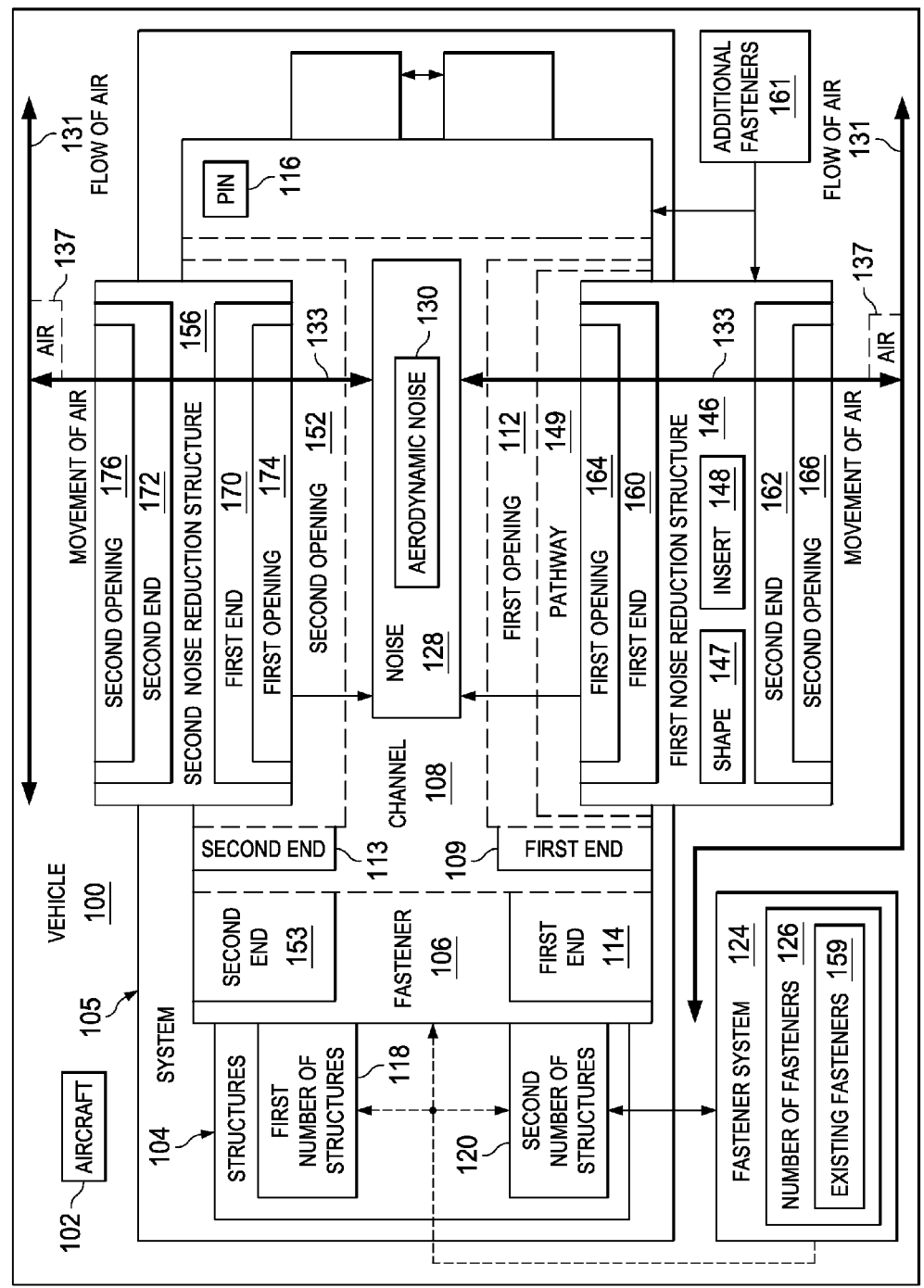
FIG. 1 is an illustration of a vehicle in accordance with an illustrative embodiment.

With reference now to the figures and, in particular, with reference to FIG. 1, an illustration of a vehicle is depicted in accordance with an illustrative embodiment. In this illustrative example, vehicle 100 may take the form of aircraft 102.

Vehicle 100 may have structures 104 in system 105. In these illustrative examples, structures 104 may include number of movable structures 122. As depicted, system 105 may take a number of different forms. System 105 may take the form of, for example, without limitation, a landing gear, a cargo bay, an engine, a control surface system, a door, a cargo door, a pivot system, a landing gear door, and some other suitable type of system.

In these illustrative examples, fastener 106 may be configured to connect structures 104 to each other in system 105. In these illustrative examples, fastener 106 may be pin 116. Fastener 106 may be comprised of a material selected from one of a metal, a metal alloy, steel, titanium, aluminum, a composite material, and other suitable materials. Fastener 106 may connect first number of structures 118 to second number of structures 120. First number of structures 118 may be configured to move relative to second number of structures 120 in structures 104 within system 105.

As used herein, a number, when used with reference to items, means one or more items. For example, first number of structures 118 may be one or more structures. In a similar fashion, second number of structures 120 may be one or more structures.

As depicted, fastener 106 may be connected to structures 104 using fastener system 124. In these illustrative examples, fastener system 124 may comprise number of fasteners 126. In these illustrative examples, a fastener in number of fasteners 126 may be selected from at least one of a bolt, a cotter pin, and/or some other suitable type of fastener.

In these illustrative examples, fastener 106 may have channel 108 with first opening 112 at first end 109 of channel 108. When all of channel 108 is formed within fastener 106, first opening 112 at first end 109 of channel 108 may be located at first end 114 of fastener 106. In some illustrative examples, channel 108 may have second opening 152 at second end 113 of channel 108 in addition to and/or in place of first opening 112 at first end 109 of channel 108. In this manner, first end 109 and/or second end 113 of channel 108 may be open, partially open, or closed.

Second opening 152 may be the same or a different size than first opening 112 for channel 108. When channel 108 is formed entirely within fastener 106, second opening 152 may be located at second end 153 of fastener 106. In this manner, channel 108 may be in communication with first end 114 and/or second end 153 of fastener 106.

In other illustrative examples, only a portion of channel 108 may be formed by fastener 106, while another portion of channel 108 may be formed by one or more other structures in addition to fastener 106. These additional structures (not shown) may be part of first number of structures 118, second number of structures 120, and/or some other group of structures. For example, without limitation, first end 114 may be located at an end of a structure (not shown) in first number of structures 118 that is connected to fastener 106.

Additionally, channel 108 may have a number of different widths or diameters through the length of channel 108. For example, without limitation, channel 108 may be narrower at first end 109 as compared to second end 113. Further, channel 108 may be narrower in a middle portion of channel 108 as compared to the portions of channel 108 at first end 109 and at second end 113. As one illustrative example, channel 108 may have a "neck" at first end 109 of channel 108, second end 113 of channel 108, or some other portion of channel 108 between first end 109 and second end 113. In some cases, one or more portions of channel 108 may be blocked or partially blocked by a number of structures located within channel 108. For example, without limitation, one or more portions of channel 108 may be walled off or partially walled off.

Noise 128 may be generated during operation of vehicle 100 in response to air 137 that flows over first opening 112 of channel 108. In particular, noise 128 may be aerodynamic noise 130. Air 137 that flows over first opening 112 may be flow of air 131. Flow of air 131 over first opening 112 may be air 137 flowing across first opening 112 in these examples.

Flow of air 131 across first opening 112 may cause movement of air 133 within channel 108. Movement of air 133 within channel 108 may be movement within at least a portion of channel 108. This movement of air 133 may generate noise 128.

In these illustrative examples, movement of air 133 within channel 108 may include movement in any number of directions within channel 108. In particular, movement of air 133 within channel 108 may be air 137 oscillating within at least a portion of channel 108 in response to flow of air 131 across first opening 112. Air 137 oscillating within at least a portion of channel 108 may be oscillations of air 137 within one or more portions of channel 108, oscillations of air 137 throughout channel 108, oscillations of air 137 at first end 109 and/or second end 113 of channel 108, and/or other suitable types of oscillations of air 137 within channel 108.

When vehicle 100 takes the form of aircraft 102, air may flow over first opening 112 during one or more phases of flight for aircraft 102. In other words, air may flow over first opening 112 as aircraft 102 is taxiing, taking off, cruising, landing, climbing, descending, and/or moving in some other suitable manner.

In these illustrative examples, noise 128 may be reduced to within selected tolerances using a structure. This structure may be a noise reduction structure, such as first noise reduction structure 146 and/or second noise reduction structure 156. Noise 128 may be reduced to within selected tolerances when noise 128 is below a selected level of audibility. Audibility may be the level or degree to which a sound or tone is perceptible to the human ear.

First noise reduction structure 146 may be associated with fastener 106. When one component is "associated" with another component, the association may be a physical association in these depicted examples. For example, a first component, such as first noise reduction structure 146, may be considered to be associated with a second component, such as fastener 106, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, first noise reduction structure 146 may take the form of insert 148. In these illustrative examples, insert 148 may be positioned at first opening 112 in channel 108 such that noise 128 may be reduced during operation of vehicle 100. For example, without limitation, insert 148 may be slid into a position relative to channel 108 through first opening 112. Further, insert 148 may extend partially into and/or out of channel 108 from first opening 112.

As depicted, first noise reduction structure 146 may have first end 160 and second end 162. In one illustrative example, first end 160 may be placed into first opening 112 of channel 108 at first end 114 of fastener 106. First end 160 and second end 162 may be fully open, partially open, or closed. As one illustrative example, first end 160 may have first opening 164, and second end 162 may have second opening 166. In another example, first end 160 may have first opening 164, while second end 162 may be closed.

First noise reduction structure 146 may be configured to change movement of air 133 within channel 108 such that noise 128 generated in response to flow of air 131 over first opening 112 is reduced. In particular, first noise reduction structure 146 may reduce movement of air 133 within channel 108 to reduce noise 128.

In these illustrative examples, first noise reduction structure 146 may have shape 147 that is configured to change movement of air 133 over first opening 112 in a manner that reduces noise 128. Shape 147 may include a shape for first end 160 and/or second end 162 of first noise reduction structure 146.

First noise reduction structure 146 may be configured to reduce pathway 149 for movement of air 133 through channel 108 at first opening 112 for channel 108. Pathway 149 may be for air to move into and/or out of channel 108 at first opening 112. For example, without limitation, shape 147 may be configured such that first noise reduction structure 146 at least reduces a size of first opening 112 to reduce movement of air 133 in a manner that reduces noise 128. In other cases, shape 147 may be configured such that first noise reduction structure 146 converts first opening 112 to a number of smaller openings.

In some illustrative examples, shape 147 of first noise reduction structure 146 may include a particular shape at second end 162 and/or first end 160 that is configured to change movement of air 133 within channel 108 in a manner that reduces noise 128. For example, without limitation, first noise reduction structure 146 may have a curved shape, a scalloped shaped, a toothed shape, or some other suitable shape at second end 162 that changes movement of air 133 within channel 108.

In particular, this shape of second end 162 may be configured to disrupt flow of air 131 across first opening 112 such that movement of air 133 within channel 108 is reduced. The shape of second end 162 may be any shape that changes the edges of first opening 112 for channel 108 encountered by flow of air 131 in a manner that reduces movement of air 133 within channel 108 such that noise 128 is reduced to within selected tolerances.

In these illustrative examples, one manner in which first noise reduction structure 146 may be associated with fastener 106 may be through number of fasteners 126 in fastener system 124. In other words, number of fasteners 126 used to connect fastener 106 to structures 104 may also be used to connect first noise reduction structure 146 to fastener 106. In other words, one or more of number of fasteners 126 may be used to connect first noise reduction structure 146 to fastener 106 relative to first opening 112. In other words, number of fasteners 126 used to connect first noise reduction structure 146 to fastener 106 may be existing fasteners 159.

In other illustrative examples, additional fasteners 161, which are not normally used to connect fastener 106 to structures 104, may be used to connect first noise reduction structure 146 to fastener 106. For example, without limitation, additional fasteners 161, such as torsion link pins, may be used to connect first noise reduction structure 146 to fastener 106.

When channel 108 has second opening 152, second noise reduction structure 156 may be used to reduce noise 128 generated by movement of air 133 within channel 108 in response to flow of air 131 over second opening 152. Second noise reduction structure 156 may have first end 170 and second end 172. First end 170 and second end 172 may be fully open, partially open, or closed. As one illustrative example, first end 170 may have first opening 174, and second end 172 may have second opening 176. In another example, first end 170 may have first opening 174, while second end 172 may be closed.

Second noise reduction structure 156 may be implemented in a manner similar to first noise reduction structure 146. Depending on the implementation, second noise reduction structure 156 may have a same or different shape compared to first noise reduction structure 146.

In these illustrative examples, first noise reduction structure 146 and second noise reduction structure 156 may be comprised of different types of materials. For example, without limitation, first noise reduction structure 146 and/or second noise reduction structure 156 may be comprised of a material selected from one of a metal, a metal alloy, steel, titanium, aluminum, a composite material, polycarbonate, an acrylic, a polyamide, a plastic, a ceramic material, a ceramic composite material, and other suitable materials.

The illustration of vehicle 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a number of fasteners associated with a number of noise reduction structures in addition to fastener 106 and first noise reduction structure 146 may be used in vehicle 100. Further, although illustrative examples of an illustrative embodiment are described with vehicle 100 taken in the form of aircraft 102, an illustrative embodiment may be applied to other types of vehicles other than aircraft 102. For example, without limitation, vehicle 100 also may be an aircraft, an unmanned aerial vehicle, a spacecraft, a space shuttle, and other suitable types of vehicles in which noise 128 may be a concern.

Figure 2:
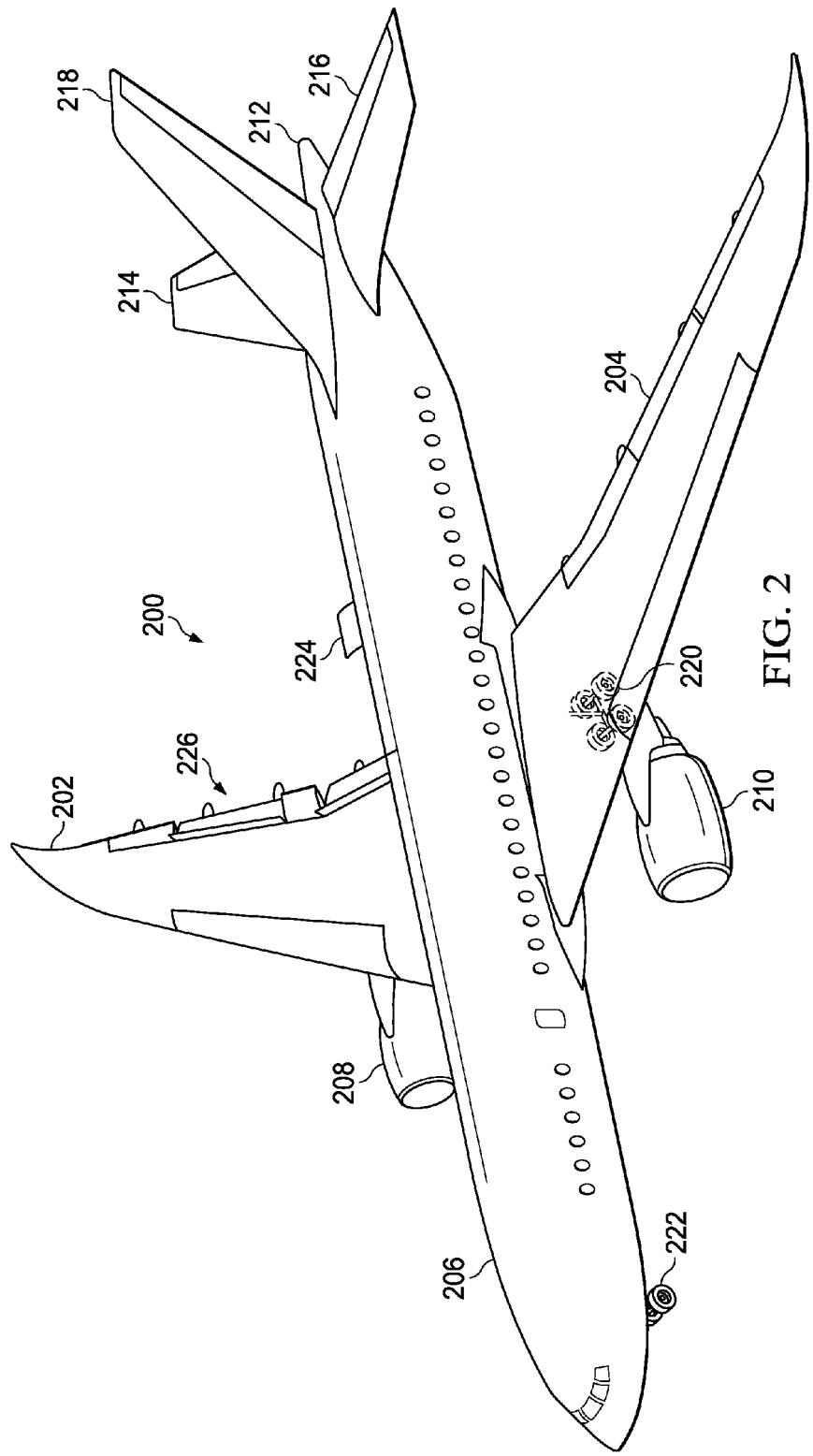
FIG. 2 is an illustration of an aircraft in which an illustrative embodiment may be implemented.

With reference now to FIG. 2, an illustration of an aircraft is depicted in which an illustrative embodiment may be implemented. Aircraft 200 may be an example of one implementation for aircraft 102 shown in block form in FIG. 1.

Aircraft 200 may have wing 202 and wing 204 attached to body 206. Aircraft 200 also may include engine 208 and engine 210. Engine 208 may be connected to wing 202, while engine 210 may be connected to wing 204. Further, aircraft 200 may have tail section 212. Tail section 212 may include horizontal stabilizer 214, horizontal stabilizer 216, and vertical stabilizer 218. In these illustrative examples, fasteners with noise reduction structures (not shown) may be implemented in accordance with an illustrative embodiment in various systems, such as, for example, without limitation, at least one of main landing gear 220, nose landing gear 222, cargo door 224, flap 226, and other suitable systems in aircraft 200.

Figure 3:
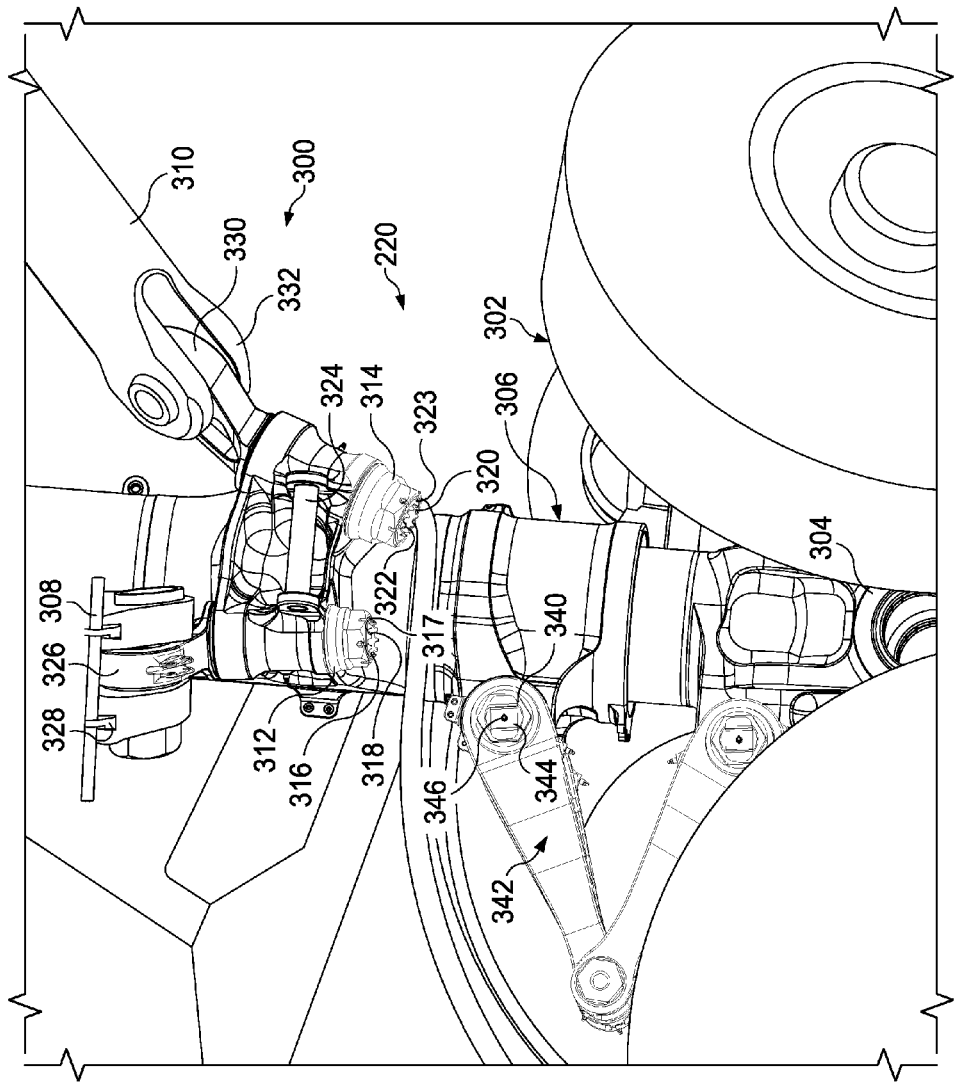
FIG. 3 is a more-detailed illustration of landing gear in accordance with an illustrative embodiment.

With reference next to FIG. 3, a more-detailed illustration of landing gear is depicted in accordance with an illustrative embodiment. In this illustrative example, a more-detailed view of main landing gear 220 is shown.

In this illustrative example, main landing gear 220 may include structures 300. For example, without limitation, structures 300 in main landing gear 220 may comprise wheels 302 connected to truck 304. Additionally, structures 300 also may include strut assembly 306. Brace 308 and brace 310 in structures 300 may be connected to strut assembly 306.

As depicted, fastener 312 may connect strut assembly 306 to brace 308. Fastener 314 may connect strut assembly 306 to brace 310. Brace 308 may be movable relative to strut assembly 306. Brace 310 may be movable relative to strut assembly 306.

Fastener 312 may be associated with noise reduction structure 316 at second end 317 of fastener 312 and may take the form of insert 318. In a similar fashion, noise reduction structure 320 may take the form of insert 322 associated with fastener 314 at second end 323 of fastener 314.

As depicted, fastener 312 and fastener 314 may extend through connecting structure 324 and may be connected to connecting structure 324 in strut assembly 306. Fastener 312 may have first end 326 connected to connecting structure 328 in brace 308. First end 330 of fastener 314 may be connected to connecting structure 332 for brace 310 in this illustrative example.

As another illustrative example, fastener 340 may connect strut assembly 306 to link structure 342 for truck 304. As depicted, noise reduction structure 344 may be associated with fastener 340. In this illustrative example, noise reduction structure 344 also may take the form of insert 346.

Figure 4:
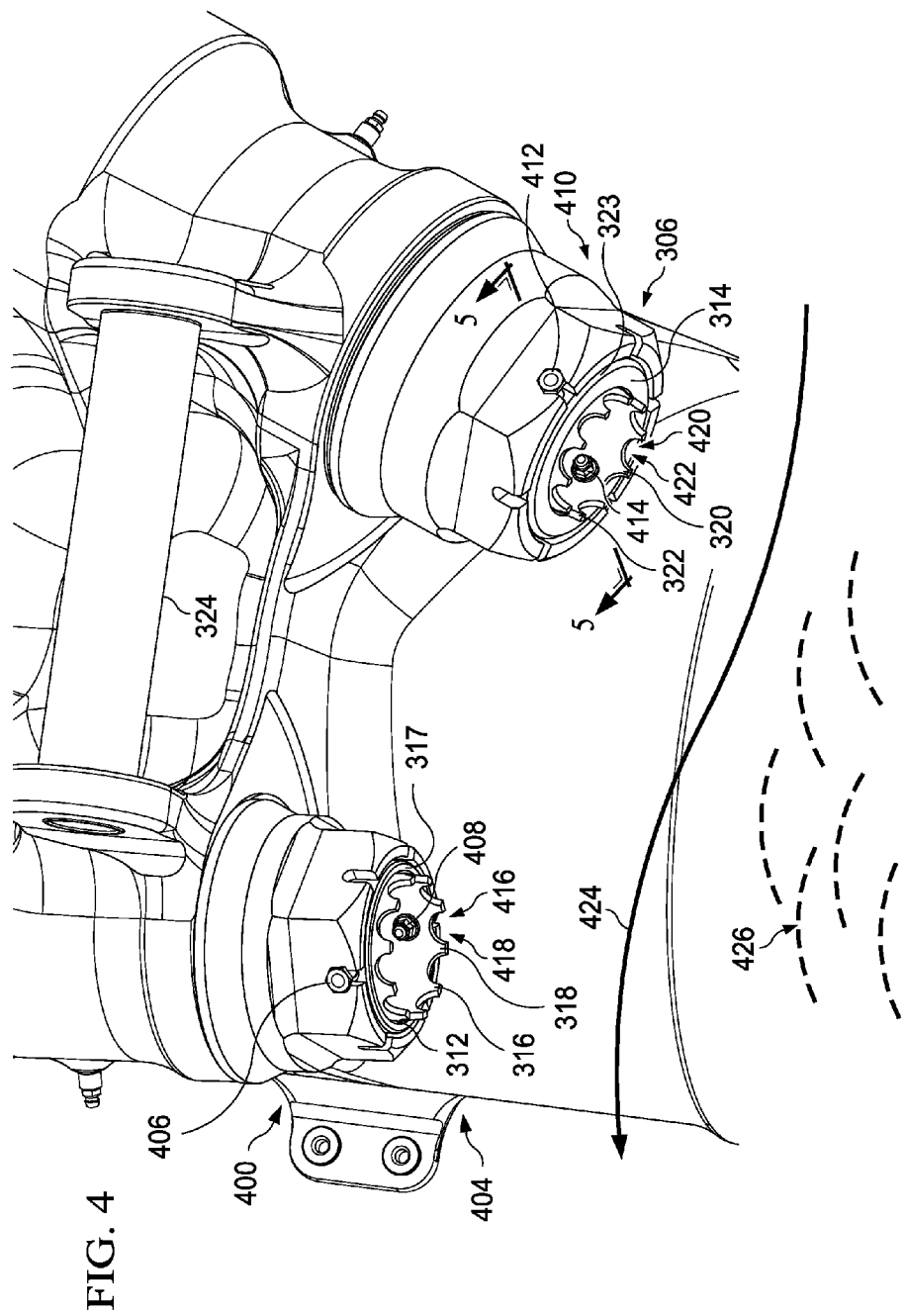
FIG. 4 is a more-detailed illustration of noise reduction structures associated with fasteners in accordance with an illustrative embodiment.

Turning now to FIG. 4, a more-detailed illustration of noise reduction structures associated with fasteners is depicted in accordance with an illustrative embodiment. In this illustrative example, fastener system 400 may connect fastener 312 to connecting structure 324.

In a similar fashion, fastener system 400 may connect fastener 314 to connecting structure 324. In this illustrative example, fastener system 400 may comprise number of fasteners 404. In particular, number of fasteners 404 may include fastener 406 and fastener 408. Fastener system 400 may comprise number of fasteners 410. Number of fasteners 410 may include fastener 412 and fastener 414.

In these illustrative examples, fastener system 400 also may connect noise reduction structure 316 to fastener 312. Fastener 312 may have channel 416 in communication with opening 418. In this illustrative example, noise reduction structure 316 may be connected to fastener 312 and may be located partially within channel 416 at opening 418. In particular, noise reduction structure 316 may be connected to fastener 312 using fastener 406 and fastener 408.

In a similar fashion, fastener system 400 may connect noise reduction structure 320 to fastener 314. In this illustrative example, fastener 314 may have channel 420 in communication with opening 422. Also, noise reduction structure 320 may be located at least partially in channel 420 in opening 422. Noise reduction structure 320 may be connected to fastener 314 using fastener 412 and fastener 414. In this manner, additional components for connecting noise reduction structure 316 and noise reduction structure 320 to fastener 312 and fastener 314, respectively, may be optional.

As illustrated, flow of air 424 may pass over opening 418 of fastener 312 and opening 422 of fastener 314. Noise 426 generated by a movement of air (not shown) within channel 416 and channel 420 in response to flow of air 424 across opening 418 and opening 422, respectively, may be reduced by noise reduction structure 316 and noise reduction structure 320, respectively. In particular, noise reduction structure 316 and noise reduction structure 320 may reduce the movement of air within channel 416 and channel 420, respectively, to reduce noise 426.

Figure 5:
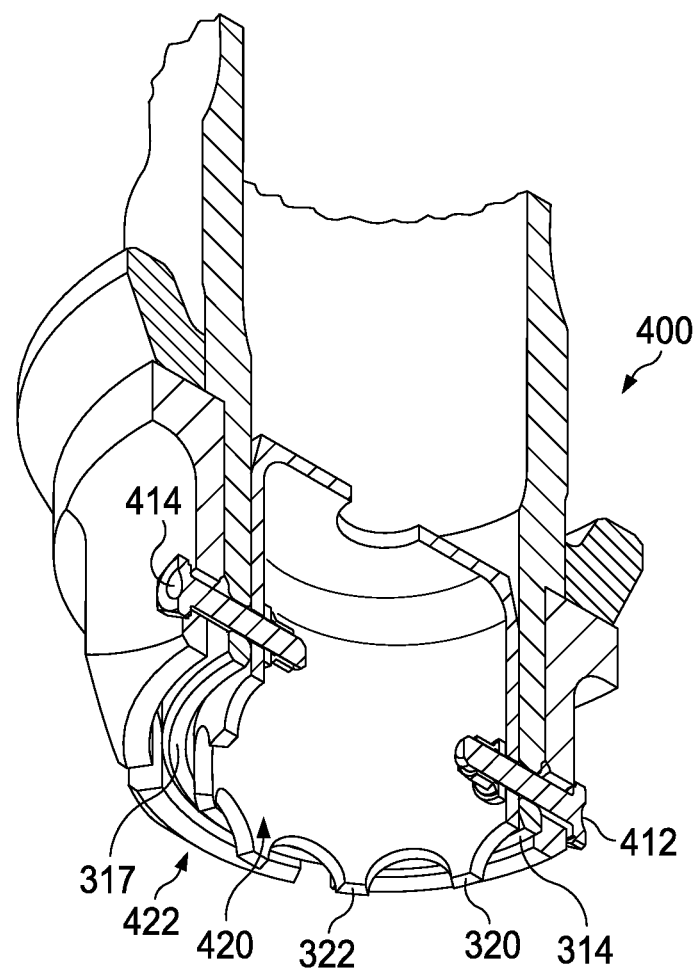
FIG. 5 is a cross-sectional view of a fastener and a noise reduction structure in accordance with an illustrative embodiment.

With reference next to FIG. 5, a cross-sectional view of a fastener and a noise reduction structure is depicted in accordance with an illustrative embodiment. In this illustrative example, an isometric cross-sectional view of fastener 314 and noise reduction structure 320 are seen taken along lines 5-5 in FIG. 4.

Turning now to FIG. 6, an illustration of a fastener with a noise reduction structure is depicted in accordance with an illustrative embodiment. In this illustrative example, an isometric view of fastener 314 with noise reduction structure 320 is depicted.

Turning now to FIG. 7, an illustration of a fastener is depicted in accordance with an illustrative embodiment. In this illustrative example, fastener 314 is shown without noise reduction structure 320.

Figure 8:
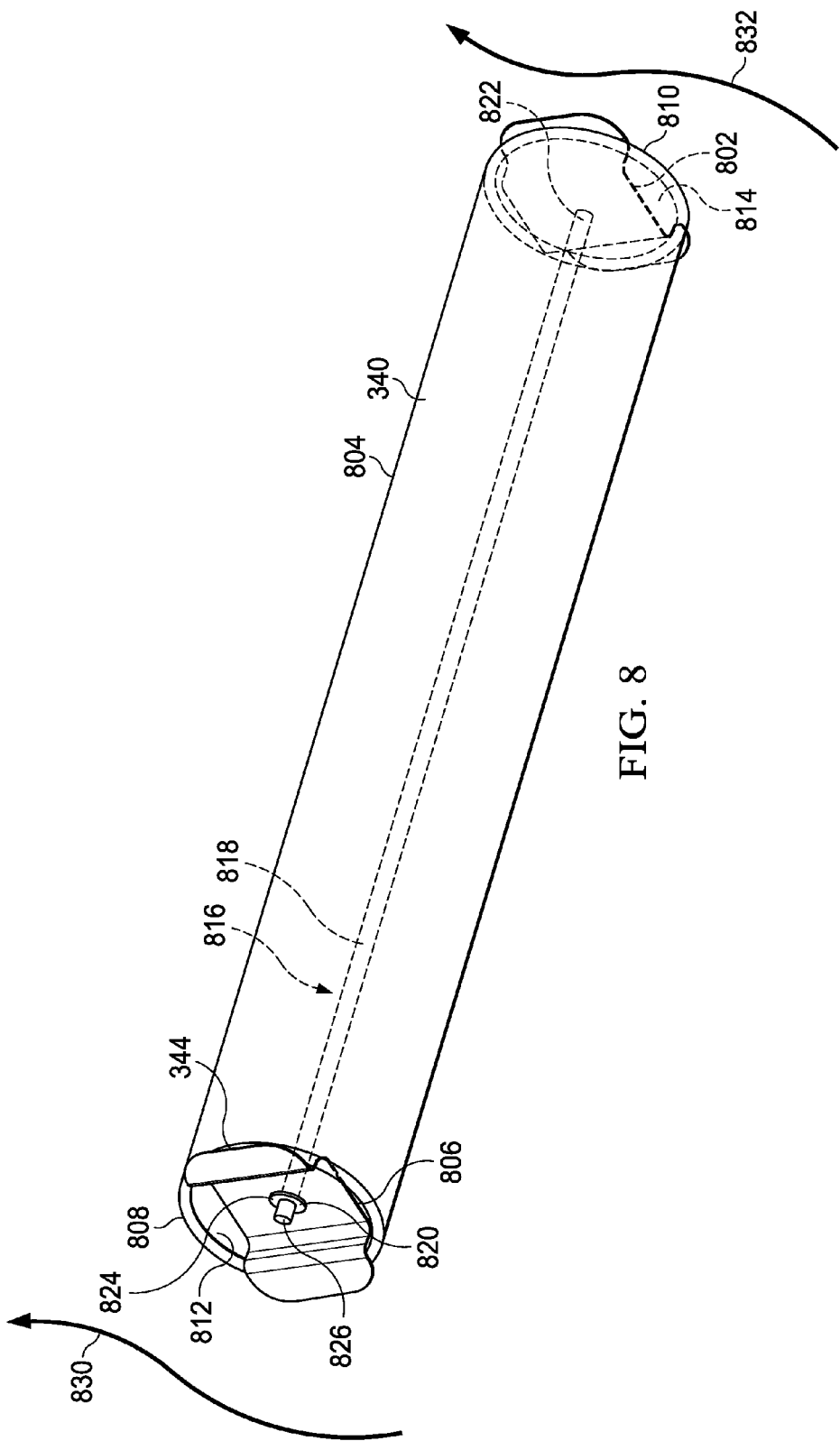
FIG. 8 is an illustration of noise reduction structures associated with a fastener in accordance with an illustrative embodiment.

With reference now to FIG. 8, an illustration of noise reduction structures associated with a fastener is depicted in accordance with an illustrative embodiment. In this illustrative example, noise reduction structure 344 and noise reduction structure 802 may be shown connected to fastener 340. As depicted, fastener 340 may be pin 804 with channel 806 extending from first end 808 to second end 810.

Channel 806 may be in communication with first opening 812 at first end 808 and may be in communication with second opening 814 at second end 810. In this illustrative example, noise reduction structure 344 and noise reduction structure 802 may be examples of an implementation for first noise reduction structure 146 in FIG. 1.

As depicted, noise reduction structure 344 and noise reduction structure 802 may be connected to fastener 340 through fastener system 816. Fastener system 816 may be a separate fastener system from fastener system 124 in FIG. 1. In this illustrative example, fastener system 816 may comprise rod 818 having first end 820 and second end 822. Rod 818 is shown in phantom within channel 806. As depicted, rod 818 may extend through channel 806 from first end 808 to second end 810.

In this illustrative example, fastener system 816 also may include nut 824 and pin 826. Nut 824 and pin 826 may be attached to first end 820 of rod 818 in a manner that may connect noise reduction structure 344 to first end 808 of fastener 340. Another nut and pin (not shown) may be connected to second end 822 of rod 818 to connect noise reduction structure 802 to second end 810 of fastener 340. In these illustrative examples, noise reduction structure 344 and noise reduction structure 802 may be configured to reduce noise caused by flow of air 830 and flow of air 832 over first opening 812 and second opening 814, respectively.

Figure 9:
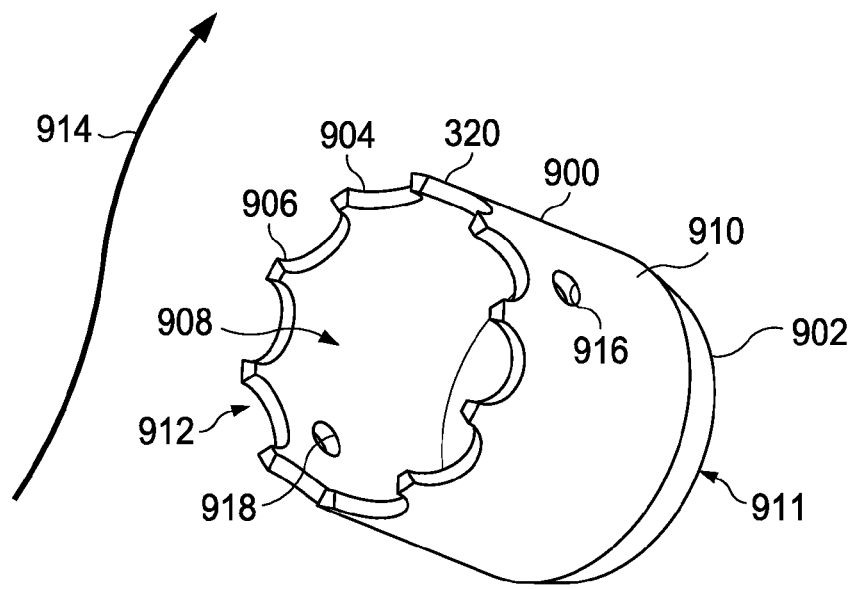
FIG. 9 is an illustration of a noise reduction structure in accordance with an illustrative embodiment.

With reference now to FIG. 9, an illustration of a noise reduction structure is depicted in accordance with an illustrative embodiment. In this illustrative example, a more-detailed illustration of noise reduction structure 320 is depicted in accordance with an illustrative embodiment.

In this illustrative example, noise reduction structure 320 may have cylindrical shape 900. Noise reduction structure 320 may have first end 902 and second end 904.

In this illustrative example, noise reduction structure 320 may have channel 908. Channel 908 may extend through noise reduction structure 320 from first end 902 to second end 904. In this illustrative example, channel 908 may be in communication with exterior 910 of noise reduction structure 320 through first opening 911 at first end 902 and second opening 912 at first end 902. First opening 911 at first end 902 may be completely open, partially open, or closed in these illustrative examples.

First end 902 may be configured to be placed into channel 420 (not shown) through opening 422 (not shown). In this illustrative example, second end 904 may have shape 906.

In these illustrative examples, shape 906 at second end 904 may be configured to change a movement of air within channel 420 (not shown) of fastener 314 (not shown) in response to flow of air 914 in a manner that reduces noise that may be generated. In particular, shape 906 may be configured to disrupt flow of air 914 to reduce the movement of air within channel 420 (not shown) of fastener 314 (not shown) when noise reduction structure 320 (not shown) is inserted in channel 420 (not shown).

Additionally, noise reduction structure 320 also may have hole 916 and hole 918. Hole 916 and hole 918 may be configured to receive number of fasteners 410 in fastener system 400 in FIG. 4. Number of fasteners 410 may be used to connect noise reduction structure 320 to fastener 314.

Figure 10:
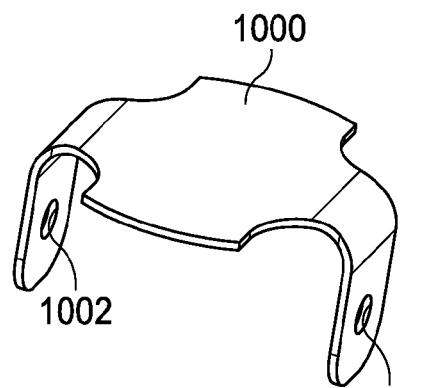
FIG. 10 is an illustration of a noise reduction structure in accordance with an illustrative embodiment.

With reference now to FIG. 10, an illustration of a noise reduction structure is depicted in accordance with an illustrative embodiment. In this illustrative example, noise reduction structure 1000 is an example of another configuration for a noise reduction structure that may be used in at least one of fastener 312 and fastener 314 in FIGS. 3 and 4.

In this illustrative example, noise reduction structure 1000 may have hole 1002 and hole 1004. Hole 1002 and hole 1004 may be configured to be connected to number of fasteners 404 (now shown) or number of fasteners 410 (not shown) in fastener system 400 in FIG. 4.

Figure 11:
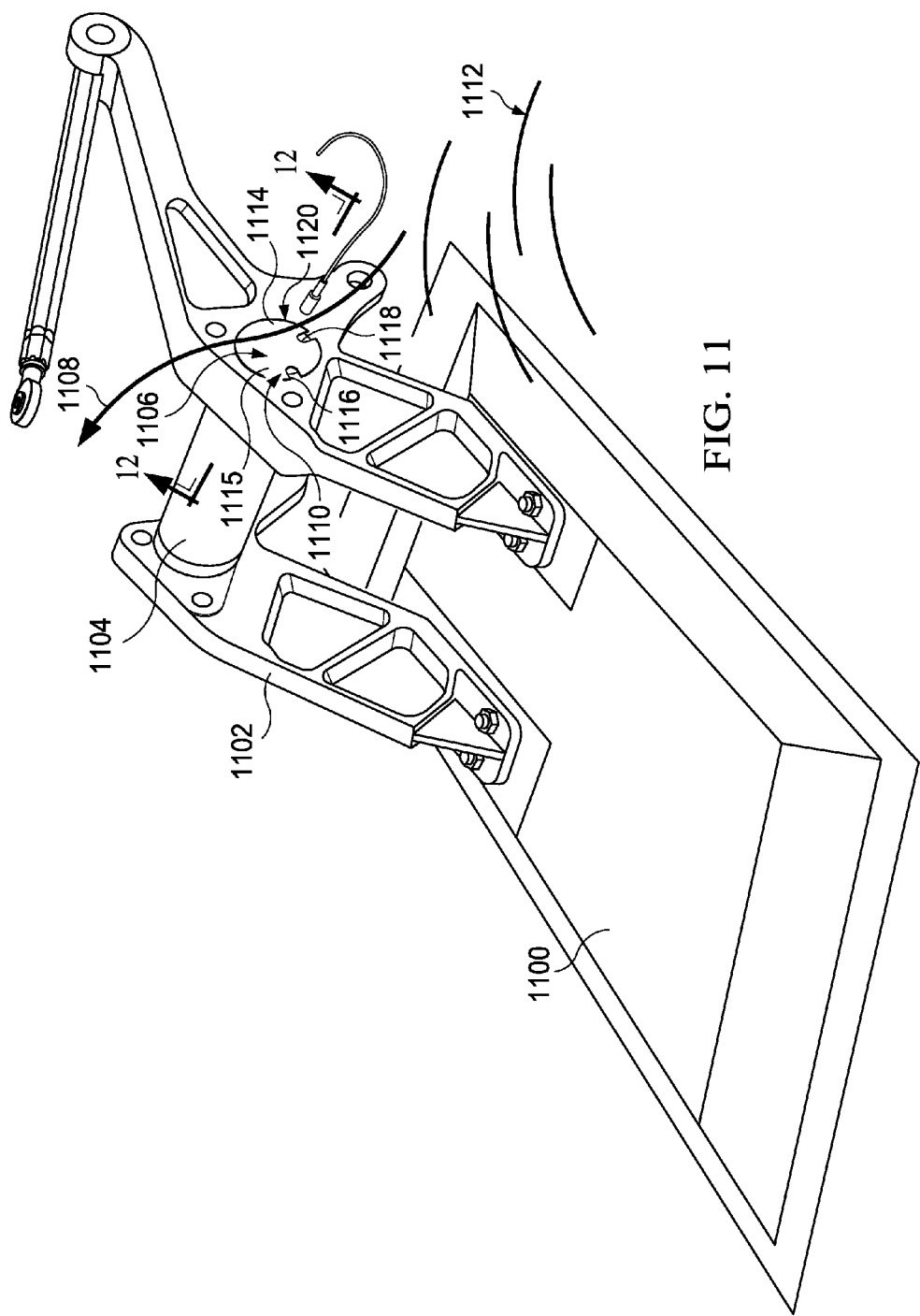
FIG. 11 is an illustration of a landing gear door with a fastener having a noise reduction structure in accordance with an illustrative embodiment.

Turning now to FIG. 11, an illustration of a landing gear door with a fastener having a noise reduction structure is depicted in accordance with an illustrative embodiment. In this illustrative example, landing gear door 1100 may be a landing gear door for main landing gear 220 in FIG. 2.

As depicted, landing gear door 1100 may be movably attached to connecting structure 1102. In this illustrative example, fastener 1104 may connect landing gear door 1100 to connecting structure 1102. Fastener 1104 may include noise reduction structure 1106. Noise reduction structure 1106 may be configured to change a movement of air within channel 1120 in response to flow of air 1108 over opening 1110 in fastener 1104. Channel 1120 may be at least partially formed within fastener 1104. In particular, noise reduction structure 1106 may reduce the movement of air within channel 1120 in a manner that reduces noise 1112 generated by flow of air 1108 over opening 1110 of fastener 1104.

As illustrated, noise reduction structure 1106 may take the form of insert 1114. This insert is in the form of cap 1115 that is placed into opening 1110 in fastener 1104. Cap 1115 may have opening 1116 and opening 1118. Opening 1116 and opening 1118 may allow moisture to leave channel 1120 in fastener 1104.

Figure 12:
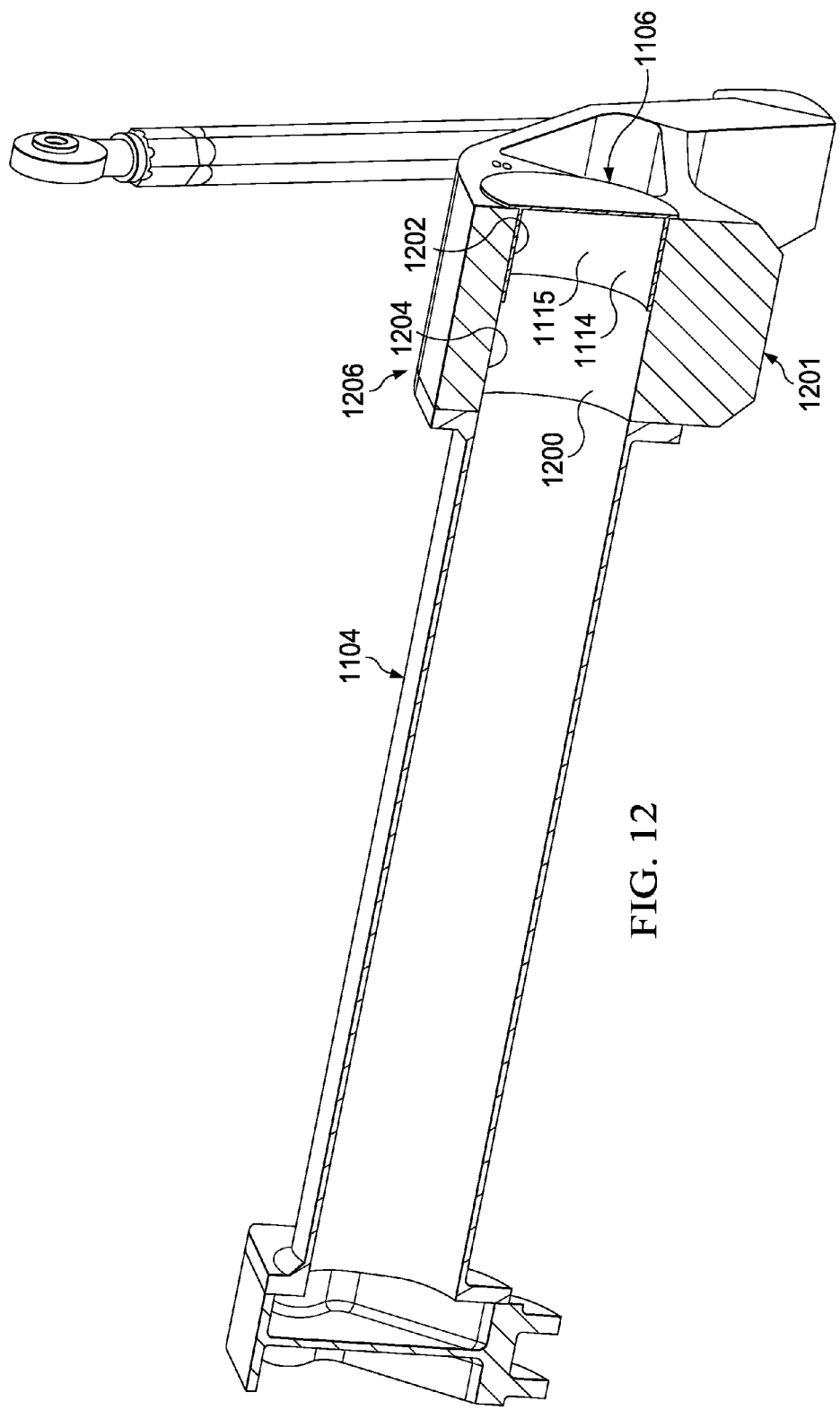
FIG. 12 is an illustration of a cross-sectional view of a fastener with a noise reduction structure in accordance with an illustrative embodiment.

Turning next to FIG. 12, an illustration of a cross-sectional view of a fastener with a noise reduction structure is depicted in accordance with an illustrative embodiment. In this illustrative example, fastener 1104 with noise reduction structure 1106 is shown in a cross-sectional view taken along lines 12-12 in FIG. 11.

As can be seen in this illustrative example, channel 1120 may be formed by fastener 1104 and structure 1201. At least a portion of noise reduction structure 1106 may be located within channel 1120. In this manner, corrosion and other undesirable conditions may be reduced.

As can be seen in this illustrative example, noise reduction structure 1106 may be held in channel 1120 through a mechanism other than fasteners. For example, without limitation, noise reduction structure 1106 may be associated with fastener 1104 using at least one of interference fit 1202, adhesive 1204, tape 1206, and/or some other suitable securing system.

The different components shown in FIGS. 2-12 may be combined with components in FIG. 1, used with components in FIG. 1, or a combination of the two. Additionally, some of the components in FIGS. 2-12 may be illustrative of how components shown in block form in FIG. 1 may be implemented as physical structures.

Further, the illustration of the different components in FIGS. 2-12 are not meant to imply physical or architectural limitations to the manner in which these components may be implemented.

For example, although noise reduction structure 316 and noise reduction structure 320 are shown as being connected to fastener 312 and fastener 314, respectively, through fastener system 400 in FIG. 4, these noise reduction structures may be connected to the fasteners in other ways. For example, noise reduction structure 320 may be connected to fastener 312 through a different fastener system.

As another example, noise reduction structure 316 may be connected to fastener 312 through at least one of an interference fit, a weld, adhesive, or some other suitable connecting mechanism. Further, fastener 312 and fastener 314 are shown with only a single opening. In other illustrative examples, these fasteners may have an additional opening.

As yet another example, the shapes illustrated for the noise reduction structures in FIGS. 2-12 are not meant to imply limitations or restrictions to the manner in which other noise reduction structures may be implemented. For example, other noise reduction structures may have other shapes, such as a hexagonal or pentagonal shape, rather than a cylindrical shape. Of course, any shape or configuration may be employed for the noise reduction structures, depending on the particular implementation.

Figure 13:
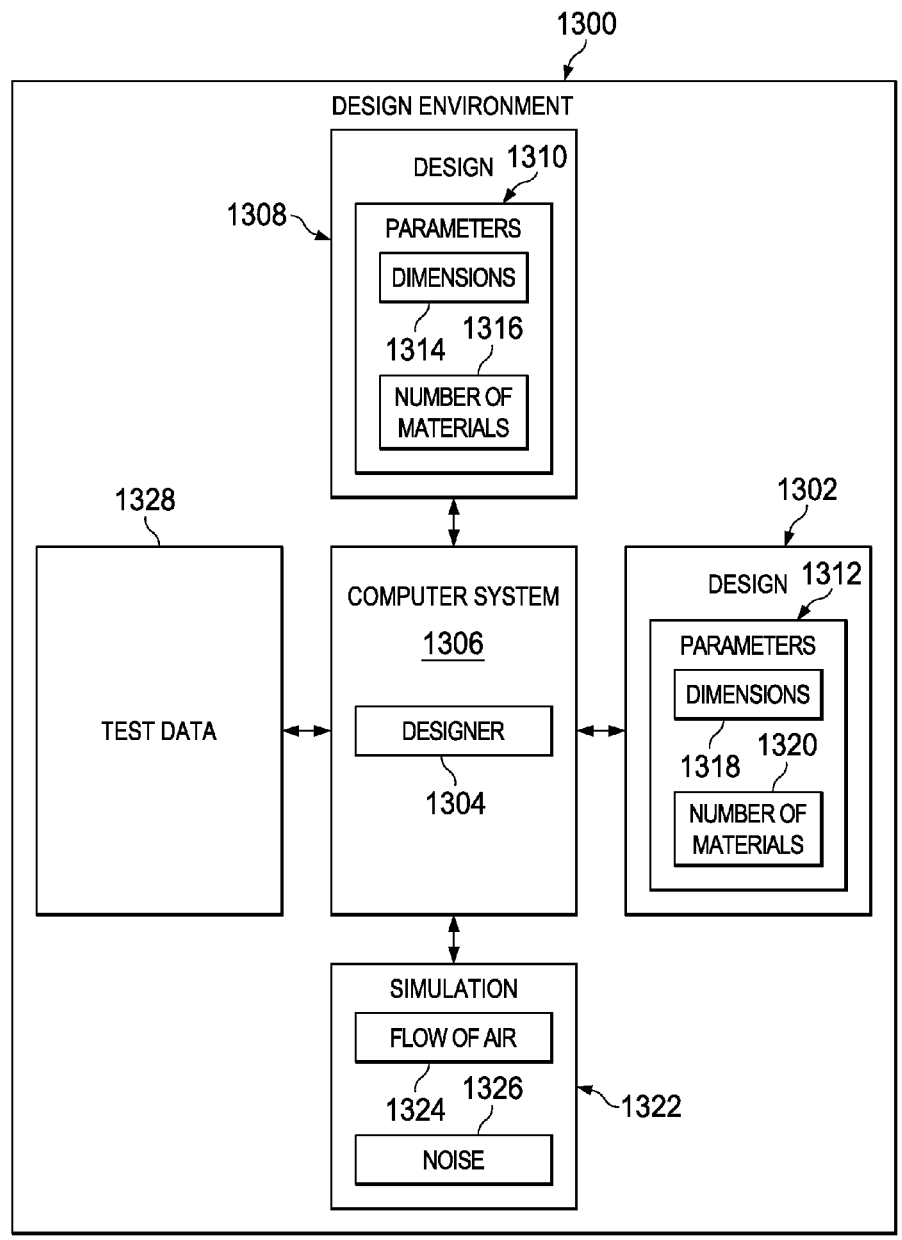
FIG. 13 is an illustration of a design environment in accordance with an illustrative embodiment.

Turning next to FIG. 13, an illustration of a design environment is depicted in accordance with an illustrative embodiment. Design environment 1300 may be used to generate design 1302 and design 1308 for first noise reduction structure 146 and fastener 106 in FIG. 1.

In this illustrative example, design 1302 may be generated by designer 1304. Designer 1304 may be implemented using hardware, software, or a combination of the two. In this illustrative example, designer 1304 may be implemented using computer system 1306. Computer system 1306 may be one or more computers. When more than one computer is present in computer system 1306, these computers may be in communication with each other using a medium, such as a network.

In this illustrative example, designer 1304 may receive design 1308 as input to generate design 1302. Design 1308 may be for fastener 106 in FIG. 1. In this illustrative example, parameters 1310 for fastener 106 may be used to generate parameters 1312 for design 1302 of first noise reduction structure 146. Parameters 1310 may include dimensions 1314 and number of materials 1316 for fastener 106. Parameters 1312 for first noise reduction structure 146 may include dimensions 1318 and number of materials 1320.

In these illustrative examples, design 1302 and design 1308 may be analyzed. For example, without limitation, simulation 1322 may be run using design 1302 and design 1308 to determine whether flow of air 1324 may be changed to reduce noise 1326 when flow of air 1324 passes over fastener 106 with first noise reduction structure 146.

Also, design 1302 and design 1308 may be used to manufacture fastener 106 with first noise reduction structure 146. Testing may be performed to obtain test data 1328. As a result, design 1302 for first noise reduction structure 146 may be changed as needed, depending on simulation 1322 and/or test data 1328.

Figure 14:
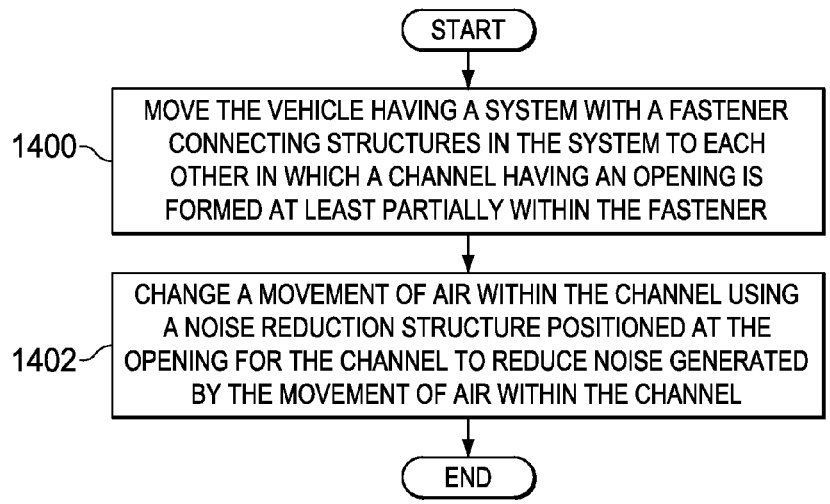
FIG. 14 is an illustration of a flowchart of a process for operating a vehicle in accordance with an illustrative embodiment.

Turning now to FIG. 14, an illustration of a flowchart of a process for operating a vehicle is depicted in accordance with an illustrative embodiment. In this illustrative example, the process illustrated in FIG. 14 may be implemented in vehicle 100 in FIG. 1.

The process may begin by moving vehicle 100 having system 105 with fastener 106 connecting structures 104 in system 105 to each other in which channel 108 having first opening 112 is formed at least partially within fastener 106 (operation 1400). The process may change movement of air 133 within channel 108 using first noise reduction structure 146 positioned at first opening 112 for channel 108 to reduce noise 128 generated by movement of air 133 within channel 108 (operation 1402), with the process terminating thereafter. Noise 128 may be generated in response to flow of air 131 over first opening 112 for channel 108 causing movement of air 133 within channel 108.

In operation 1402, first noise reduction structure 146 may be configured to change movement of air 133 within channel 108 in a manner that reduces noise 128 generated by movement of air 133 within channel 108 to within the selected tolerances. In particular, oscillations of air 137 within channel 108 may be reduced to a level within selected tolerances such that noise 128 is reduced to within selected tolerances. Operation 1402 may be performed by reducing a pathway for movement of air 133 at first opening 112 for channel 108 and disrupting flow of air 131 over first opening 112 for channel 108.

Figure 15:
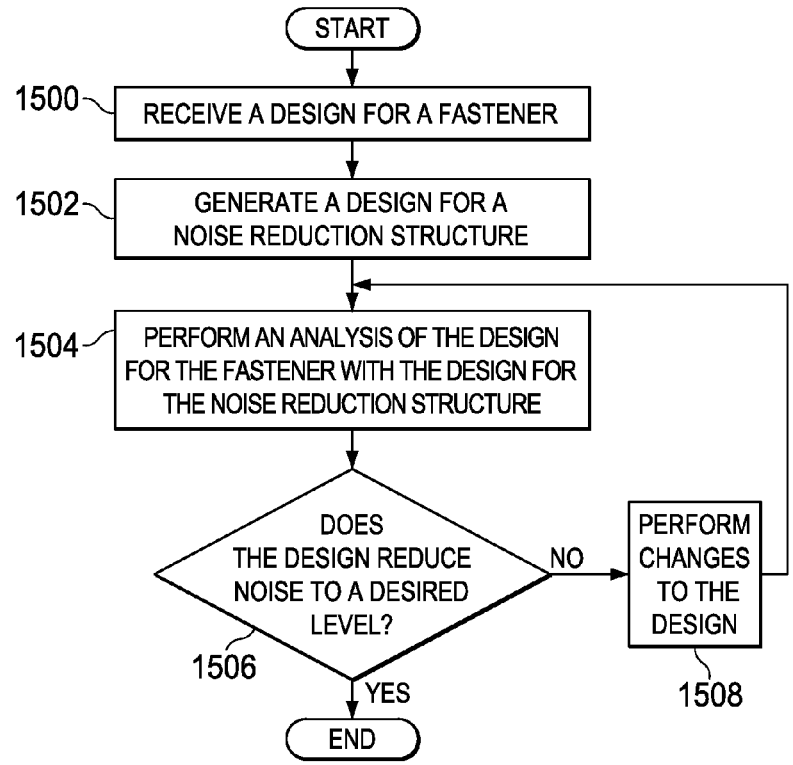
FIG. 15 is an illustration of a flowchart of a process for designing a noise reduction structure for a fastener in accordance with an illustrative embodiment.

Turning next to FIG. 15, an illustration of a flowchart of a process for designing a noise reduction structure for a fastener is depicted in accordance with an illustrative embodiment. The process illustrated in FIG. 15 may be implemented in design 1302 in FIG. 13.

The process may begin by receiving design 1308 for fastener 106 in FIG. 1 (operation 1500). The process may then generate design 1302 for first noise reduction structure 146 in FIG. 1 (operation 1502). Thereafter, an analysis of design 1308 for fastener 106 with design 1302 for first noise reduction structure 146 may be performed (operation 1504). A determination may be made as to whether design 1302 reduces noise 1326 to a desired level (operation 1506). If design 1302 reduces noise 1326 to a desired level, the process may terminate. Otherwise, changes to design 1302 may be performed (operation 1508), with the process then returning to operation 1504 as mentioned above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, without limitation, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 16, an illustration of a data processing system is depicted in accordance with an illustrative embodiment. Data processing system 1600 may be used to implement one or more computers in computer system 1306 in FIG. 13.

In this illustrative example, data processing system 1600 may include communications framework 1602, which may provide communications between processor unit 1604, memory 1606, persistent storage 1608, communications unit 1610, input/output (I/O) unit 1612, and display 1614. In this example, communications framework 1402 may take the form of a bus system.

Processor unit 1604 may serve to execute instructions for software that may be loaded into memory 1606. Processor unit 1604 may be a number of processors, a multi-processor core, or some other type of processor, depending on the particular implementation.

Memory 1606 and persistent storage 1608 may be examples of storage devices 1616. A storage device may be any piece of hardware that is capable of storing information, such as, for example, without limitation, data, program code in functional form, and/or other suitable information either on a temporary basis and/or a permanent basis. Storage devices 1616 may also be referred to as computer readable storage devices in these illustrative examples. Memory 1606, in these examples, may be, for example, without limitation, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, without limitation, a removable hard drive may be used for persistent storage 1608.

Communications unit 1610, in these illustrative examples, may provide for communications with other data processing systems or devices. In these illustrative examples, communications unit 1610 may be a network interface card.

Input/output unit 1612 may allow for input and output of data with other devices that may be connected to data processing system 1600. For example, input/output unit 1612 may provide a connection for user input through a keyboard, a mouse, and/or some other suitable input device. Further, input/output unit 1612 may send output to a printer. Display 1614 may provide a mechanism to display information to a user.

Instructions for the operating system, applications, and/or programs may be located in storage devices 1616, which may be in communication with processor unit 1604 through communications framework 1602. The processes of the different embodiments may be performed by processor unit 1604 using computer-implemented instructions, which may be located in a memory, such as memory 1606.

These instructions may be referred to as program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 may be located in a functional form on computer readable media 1620 that may be selectively removable and may be loaded onto or transferred to data processing system 1600 for execution by processor unit 1604. Program code 1618 and computer readable media 1620 may form computer program product 1622 in these illustrative examples. In one example, computer readable media 1620 may be computer readable storage media 1624 or computer readable signal media 1626.

In these illustrative examples, computer readable storage media 1624 may be a physical or tangible storage device used to store program code 1618 rather than a medium that propagates or transmits program code 1618.

Alternatively, program code 1618 may be transferred to data processing system 1600 using computer readable signal media 1626. Computer readable signal media 1626 may be, for example, without limitation, a propagated data signal containing program code 1618. For example, computer readable signal media 1626 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1600 are not meant to provide architectural limitations to the manner in which different embodiments may be implemented. The different illustrative embodiments may be implemented in a data processing system including components in addition to and/or in place of those illustrated for data processing system 1600. Other components shown in FIG. 16 may be varied from the illustrative examples shown. The different embodiments may be implemented using any hardware device or system capable of running program code 1618.

Illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 may take place. Thereafter, aircraft 1800 may go through certification and delivery 1710 in order to be placed in service 1712. While in service 1712 by a customer, aircraft 1800 may be scheduled for routine maintenance and service 1714, which may include modification, reconfiguration, refurbishment, and other maintenance or service.

Each of the processes of aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an illustrative embodiment may be implemented. In this example, aircraft 1800 may be produced by aircraft manufacturing and service method 1700 in FIG. 17 and may include airframe 1802 with plurality of systems 1804 and interior 1806. Examples of systems 1804 may include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17.

In one illustrative example, components or subassemblies produced in component and subassembly manufacturing 1706 in FIG. 17 may be fabricated or manufactured in a manner similar to components or subassemblies produced while aircraft 1800 is in service 1712 in FIG. 17. For example, first noise reduction structure 146 in FIG. 1 may be fabricated or manufactured during component and subassembly manufacturing 1706 or while aircraft 1800 is in service 1712.

As yet another example, one or more apparatus embodiments, method embodiments, or a combination thereof may be utilized during production stages, such as component and subassembly manufacturing 1706 and system integration 1708 in FIG. 17. One or more apparatus embodiments, method embodiments, or a combination thereof may be utilized while aircraft 1800 is in service 1712 and/or during maintenance and service 1714 in FIG. 17. For example, first noise reduction structure 146 may be associated with fastener 106 in FIG. 1 while aircraft 1800 is in service 1712 or during maintenance and service 1714. As another example, a current fastener in aircraft 1800 may be replaced with fastener 106 and first noise reduction structure 146 during in service 1712 and/or during maintenance and service 1714.

The use of a number of the different illustrative embodiments may substantially expedite the assembly of and/or reduce the cost of aircraft 1800. For example, by adding first noise reduction structure 146 to an existing fastener, modifications to aircraft 1800 to reduce noise generation may be performed with less time and cost as compared to removing fasteners.

In this manner, noise may be reduced for various vehicles, such as aircraft, with the use of noise reduction structures. These noise reduction structures may change the flow of air over openings in fasteners, such as hollow pins. Further, one or more of the illustrative embodiments may be used to associate noise reduction structures with currently-existing fasteners. In this manner, new fasteners may not need to be manufactured, which may reduce costs and maintenance time.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A noise reduction apparatus comprising:
a structure configured to be positioned at an opening for a channel in which the channel is formed at least partially within a fastener and in which the structure is configured to change a movement of air within the channel to reduce noise generated by the movement of air within the channel, in which the structure has a shape at an end of the structure in which the shape is configured to disrupt a flow of air over the opening for the channel to change the movement of air within the channel such that the noise generated by the movement of air within the channel is reduced to within selected tolerances.

2. The noise reduction apparatus of claim 1 further comprising:
the fastener, wherein the opening for the channel is located at an end of the fastener and the fastener is configured to connect structures in a system to each other and wherein the structure is configured to change the movement of air within the channel in response to a flow of air over the opening for the channel located at the end of the fastener.

3. The noise reduction apparatus of claim 2, wherein the fastener is configured to be connected to the structures using a fastener system.

4. The noise reduction apparatus of claim 3, wherein the structure is configured to be associated with the fastener by at least one of the fastener system, an interference fit, adhesive, and tape.

5. The noise reduction apparatus of claim 1, wherein the movement of air within the channel is generated in response to a flow of air across the opening for the channel and wherein the structure is configured to reduce the movement of air within the channel by disrupting the flow of air across the opening for the channel.

6. The noise reduction apparatus of claim 1, wherein the movement of air within the channel is generated in response to a flow of air across the opening for the channel and wherein the structure is configured to reduce the movement of air within the channel by reducing a pathway for the movement of air through the channel at the opening for the channel.

7. The noise reduction apparatus of claim 6, wherein the structure has a first end and a second end in which the first end is configured to be placed into the channel through the opening for the channel, in which the first end and the second end are configured to be one of fully open, partially open, and closed, and in which at least one of the first end and the second end is configured to reduce the pathway for the movement of air at the opening for the channel to reduce the movement of air within the channel such that the noise generated by the movement of air through the channel is reduced to within selected tolerances.

8. The noise reduction apparatus of claim 1, wherein the structure is configured to reduce the noise to within selected tolerances.

9. The noise reduction apparatus of claim 8, wherein the structure is a noise reduction structure and is configured to reduce the noise to within the selected tolerances such that the noise is reduced to a level below a selected level of audibility.

10. The noise reduction apparatus of claim 1, wherein the movement of air within the channel is air oscillating within at least a portion of the channel in response to a flow of air across the opening for the channel and wherein the structure is configured to reduce oscillations of the air within the at least a portion of the channel.

11. The noise reduction apparatus of claim 1, wherein the fastener is a pin.

12. The noise reduction apparatus of claim 2, wherein the system is selected from one of a landing gear, a cargo bay, an engine, a control surface system, a door, a cargo door, a pivot system, and a landing gear door.

13. The noise reduction apparatus of claim 2, wherein the system is associated with a vehicle selected from one of an aircraft, an unmanned aerial vehicle, a spacecraft, and a space shuttle.

14. A method for operating a vehicle to control noise generated by the vehicle, the method comprising:
moving the vehicle in which the vehicle has a system with a fastener connecting structures in the system to each other in which a channel having an opening is formed at least partially within the fastener, in which moving the vehicle comprises moving the vehicle such that a flow of air occurs over the opening for the channel, wherein the flow of air causes the movement of air within the channel; and changing a movement of air within the channel using a structure positioned at the opening for the channel to reduce noise generated by the movement of air within the channel, in which changing the movement of the air within the channel comprises disrupting the flow of air over the opening for the channel to reduce the movement of air within the channel such that the noise generated by the movement of air within the channel is reduced using the structure, wherein the structure has a shape configured to disrupt the flow of air over the opening for the channel.

15. The method of claim 14, wherein changing the movement of air within the channel comprises:

reducing a pathway for the movement of air through the channel at the opening for the channel such that the noise generated by the movement of air within the channel is reduced using the structure, wherein the structure has a shape configured to reduce the pathway for the movement of air through the channel.

16. The method of claim 15, wherein the structure is configured to be associated with the fastener by a fastener system configured to connect the fastener to at least one of the structures in the system.

17. The method of claim 14, wherein changing the movement of air within the channel comprises:

changing the movement of air within the channel using the structure positioned at the opening for the channel to reduce the noise generated by the movement of air within the channel to within selected tolerances such that the noise is below a selected level of audibility.

18. The method of claim 14, wherein changing the movement of air within the channel comprises:

reducing oscillations of air within at least a portion of the channel to reduce the noise generated by the oscillations of air to within selected tolerances.

19. The method of claim 14 further comprising:

placing the structure in the channel through the opening for the channel such that the structure extends at least partially into the channel.

20. The method of claim 14, wherein the fastener is a pin.

21. The method of claim 14, wherein the system is selected from one of a landing gear, a cargo bay, an engine, a control surface system, a door, a cargo door, a pivot system, and a landing gear door.

22. The method of claim 14, wherein the system is associated with the vehicle selected from one of an aircraft, an unmanned aerial vehicle, a spacecraft, and a space shuttle.

23. An aircraft noise reduction system comprising:

a pin configured to connect structures in a system in an aircraft to each other in which a channel having an opening is formed at least partially within the pin; in which the pin is connected to the structures in the system using a fastener system; in which the system is selected from one of a landing gear, a cargo bay, an engine, a control surface system, a door, a cargo door, a pivot system, and a landing gear door; and a noise reduction structure positioned at the opening for the channel and configured to change a movement of air through the channel in a manner that reduces noise generated by the movement of air through the channel to within selected tolerances such that the noise is reduced to a level below a selected level of audibility in which the noise reduction structure has a first end and a second end in which the first end is configured to be placed into the channel through the opening for the channel, in which the first end and the second end are configured to be one of fully open, partially open, and closed, and in which at least one of the first end and the second end is configured to change the movement of air through the channel in the manner that reduces the noise generated by the movement of air through the channel to within the selected tolerances by at least one of reducing a pathway for the movement of air at the opening for the channel and disrupting a flow of air over the opening for the channel; and in which the noise reduction structure is configured to be associated with the pin by the fastener system.

24. A method for operating an aircraft to control noise generated by the aircraft, the method comprising:

moving the aircraft having a system with a pin connecting structures in the system to each other such that a flow of air occurs over an opening for a channel formed at least partially within the pin in which the pin is connected to the structures using a fastener system; and in which the system is selected from one of a landing gear, a cargo bay, an engine, a control surface system, a door, a cargo door, a pivot system, and a landing gear door; and changing a movement of air within the channel using a structure positioned at the opening for the channel to reduce noise generated by the movement of air within the channel to within selected tolerances in which the structure is configured to change the movement of air through the channel in a manner that reduces the noise generated by the movement of air through the channel to within the selected tolerances by at least one of reducing a pathway for the movement of air at the opening for the channel and disrupting the flow of air over the opening for the channel, in which the noise is reduced to within the selected tolerances such that the noise is reduced to a level below a selected level of audibility, and in which the noise reduction structure is configured to be associated with the pin by the fastener system.

* * * * *